US008634778B1

(12) United States Patent
Dale

(10) Patent No.: US 8,634,778 B1
(45) Date of Patent: *Jan. 21, 2014

(54) CARRIER-IN-CARRIER BASED PERFORMANCE OPTIMIZATION SYSTEMS AND RELATED METHODS

(75) Inventor: Mark Dale, Scottsdale, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 617 days.

This patent is subject to a terminal disclaimer.

(21) Appl. No.: 12/986,017

(22) Filed: Jan. 6, 2011

Related U.S. Application Data

(60) Provisional application No. 61/318,739, filed on Mar. 29, 2010.

(51) Int. Cl.
*H04B 1/00* (2006.01)
*H04B 15/00* (2006.01)

(52) U.S. Cl.
USPC .................. 455/63.1; 455/67.11; 455/522

(58) Field of Classification Search
USPC ..................... 455/63.1, 67.11, 522
See application file for complete search history.

(56) References Cited

U.S. PATENT DOCUMENTS

| 6,259,928 | B1* | 7/2001 | Vembu | 455/522 |
|---|---|---|---|---|
| 7,386,310 | B2* | 6/2008 | Dai et al. | 455/427 |
| 7,724,853 | B2* | 5/2010 | Jin et al. | 375/347 |
| 2002/0018516 | A1* | 2/2002 | Mizuguchi | 375/130 |
| 2008/0207249 | A1* | 8/2008 | Choi et al. | 455/522 |
| 2011/0212743 | A1* | 9/2011 | Yokomakura et al. | 455/509 |
| 2013/0028231 | A1* | 1/2013 | Zhang et al. | 370/329 |

* cited by examiner

*Primary Examiner* — Lewis West
(74) *Attorney, Agent, or Firm* — Booth Udall Fuller, PLC

(57) ABSTRACT

A method of transmitting telecommunications data comprising modulating a first and a second data signal, transmitting the signals to a remote receiver, the first data signal transmitted from a first terminal and the second data signal transmitted from a second terminal, transmitting, by the remote receiver, the first signal to the second terminal and the second signal to the first terminal, measuring a received signal-to-noise ratio of the first signal received at the second terminal and a received signal-to-noise ratio of the second signal received at the first terminal, and changing a transmit power of at least one of the terminals such that a margin between the signal-to-noise ratio of the first signal and a margin between the signal-to-noise ratio of the second signal is optimized, wherein the margin is equal to a difference between signal-to-noise ratio of a signal received at one terminal and a threshold signal-to-noise ratio.

22 Claims, 3 Drawing Sheets

CARRIER-IN-CARRIER BASED PERFORMANCE OPTIMIZATION SYSTEMS AND RELATED METHODS

CROSS REFERENCE TO RELATED APPLICATIONS

This document claims the benefit of the filing date of U.S. Provisional Patent Application No. 61/318,739, entitled "Carrier-in-Carrier Based Performance Optimization Systems and Related Methods" to Mark Dale which was filed on Mar. 29, 2010, the disclosure of which is hereby incorporated entirely herein by reference.

BACKGROUND

1. Technical Field

Aspects of this document relate generally to telecommunication systems and connections. Particular implementations also include, more specifically, satellite communication systems and communication links.

Satellite communications systems transmit and receive information bearing signals. Systems that employ signal-cancellation algorithms that enable terminals on each side of the link to share common transmit carrier frequencies are referred to as Carrier-in-Carrier ("CnC") based systems. CnC based systems receive a composite signal containing both the signal from the opposite terminal and its own signal transponded by the satellite. These systems have the capability to measure the received power of each of these signals as part of the process of signal cancellation.

Implementations of carrier-in-carrier ("CnC") based performance optimization systems and related methods relate to systems and methods for transmitting data across a telecommunication channel.

SUMMARY

In some implementations, a method of transmitting telecommunications data comprises modulating a first and a second data signal using a modulation format and transmitting the first and second data signals through a telecommunications channel to a remote receiver, the first data signal being transmitted from a first terminal and the second data signal being transmitted from a second terminal. The method further comprises transmitting, by the remote receiver, the first data signal to the second terminal and the second data signal to the first terminal, measuring a received signal-to-noise ratio of the first data signal received at the second terminal and a received signal-to-noise ratio of the second data signal received at the first terminal, and changing a transmit power of at least one of the first and second terminals such that a margin between the signal-to-noise ratio of the first data signal and a margin between the signal-to-noise ratio of the second data signal is optimized, wherein the margin is equal to a difference between signal-to-noise ratio of a data signal received at one terminal and a threshold signal-to-noise ratio.

In some aspects, the first and second data signals are optimized when the margin of the first data signal and the margin of the second data signal are equal at the first and second terminals. The method further comprises monitoring the margins for a loss in performance of a telecommunications link. The loss in performance is determined by a loss in power resulting from uplinking and downlinking between the terminals and remote receiver.

In some aspects, the method further comprises adjusting the transmit power of at least one of the first and second terminals in response to detection of the loss of performance of the telecommunications link such that a pre-determined power equivalent bandwidth (PEB) is maintained. The method further comprises detecting a change in attenuation by applying estimation averaging of pre-determined ratios of uplink to downlink attenuation for one or more attenuation factors.

The method further comprises adjusting the transmit power of one or more terminals when a change in attenuation is detected or monitoring a signal-to-noise ratio of a modem at two or more receiving terminals. The method further comprises detecting unequal downlink attenuation at the two or more terminals.

The method further comprises optimizing the first and second data signals if an imbalance of signal-to-noise ratios between two terminals is detected that exceeds a predetermined threshold. The method of claim 8 further comprises estimating a change in attenuation by applying estimation averaging of pre-determined ratios of uplink to downlink attenuation for one or more attenuation factors if an imbalance of signal-to-noise ratios between two terminals is less than a predetermined threshold.

In some implementations, a system of transmitting telecommunications data comprises one or more modulators that modulates a first and a second data signal using a modulation format and one or more transmitters that receive the first and second data signals from the one or more modulators and transmit the first and second data signals through a telecommunications channel to a remote receiver, the first data signal being transmitted from a first terminal and the second data signal being transmitted from a second terminal. The system further comprises a remote receiver that receives the first and second signals from the one or more transmitters and transmits the first data signal to the second terminal and the second data signal to the first terminal, one or more spectrum analyzers that measures a signal-to-noise ratio of the first data signal received at the second terminal from the remote receiver and a signal-to-noise ratio of the second data signal received at the first terminal from the remote receiver, and one or more power controllers that change a transmit power of at least one of the first and second terminals such that a margin between the signal-to-noise ratio of the first signal and a margin between the signal-to-noise ratio of the second data signal is optimized, wherein the margin is equal to a difference between signal-to-noise ratio of a data signal received at one terminal and a threshold signal-to-noise ratio.

In some aspects, the first and second data signals are optimized when the margin of the first data signal and the margin of the second data signal are equal at the first and second terminals. The one or more spectrum analyzers further monitor the margins for a loss in performance of a telecommunications link. The loss in performance is determined by a loss in power resulting from uplinking and downlinking between the terminals and remote receiver.

One or more power controllers further adjust the transmit power of at least one of the first and second terminals in response to detection of the loss of performance of the telecommunications link such that a pre-determined power equivalent bandwidth (PEB) is maintained. One or more spectrum analyzers further detect a change in attenuation by applying estimation averaging of pre-determined ratios of uplink to downlink attenuation for one or more attenuation factors.

The one or more power controllers further adjust the transmit power of one or more terminals when a change in attenuation is detected. The one or more spectrum analyzers further monitor a signal-to-noise ratio of a modem at two or more receiving terminals.

The one or more spectrum analyzers further detect unequal downlink attenuation at the two or more terminals. The one or more power controllers optimize the first and second data signals if the one or more spectrum analyzers detects an imbalance of signal-to-noise ratios between two terminals that exceeds a predetermined threshold.

The one or more spectrum analyzers estimates a change in attenuation by applying estimation averaging of pre-determined ratios of uplink to downlink attenuation for one or more attenuation factors if an imbalance of signal-to-noise ratios between two terminals is less than a predetermined threshold.

Aspects and applications of the disclosure presented here are described below in the drawings and description. Unless specifically noted, it is intended that the words and phrases in the specification and the claims be given their plain, ordinary, and accustomed meaning to those of ordinary skill in the applicable arts. The inventor is fully aware that he can be his own lexicographers if desired. The inventor expressly elects, as his own lexicographer, to use only the plain and ordinary meaning of terms in the specification and claims unless it is clearly stated otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶ 6. Thus, the use of the words "function," "means" or "step" in the Description, Drawings or claims is not intended to somehow indicate a desire to invoke the special provisions of 35 U.S.C. §112, ¶ 6, to define this disclosure. To the contrary, if the provisions of 35 U.S.C. §112, ¶ 6 are sought to be invoked to define the disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

The optimal ratio of power levels of the two signals that comprise the composite signals for carrier-in-carrier (CnC) signals may depend on various internal and external factors. For example, satellite communication signals may be attenuated by rain loss and other factors on one or both sides of the communication link.

Implementations of CnC based performance optimization systems and methods like those disclosed in this document enable the automatic calculation and control of the terminal transmit powers and signal ratios in the composite CnC signal. Particular implementations disclosed herein may automatically optimize power ratios in a composite CnC carrier to provide optimal link margin for each terminal, and maintain this optimum solution under rain loss conditions on either side of the link. While particular implementations are disclosed involving a satellite, the principles disclosed in this document could be used in any of a wide variety of other telecommunication systems that a CnC signal, such as, by non-limiting example, terrestrial wireless hub/spoke systems, cellular telephone communication systems, microwave communication systems, and other telecommunication system types.

Figure 1:
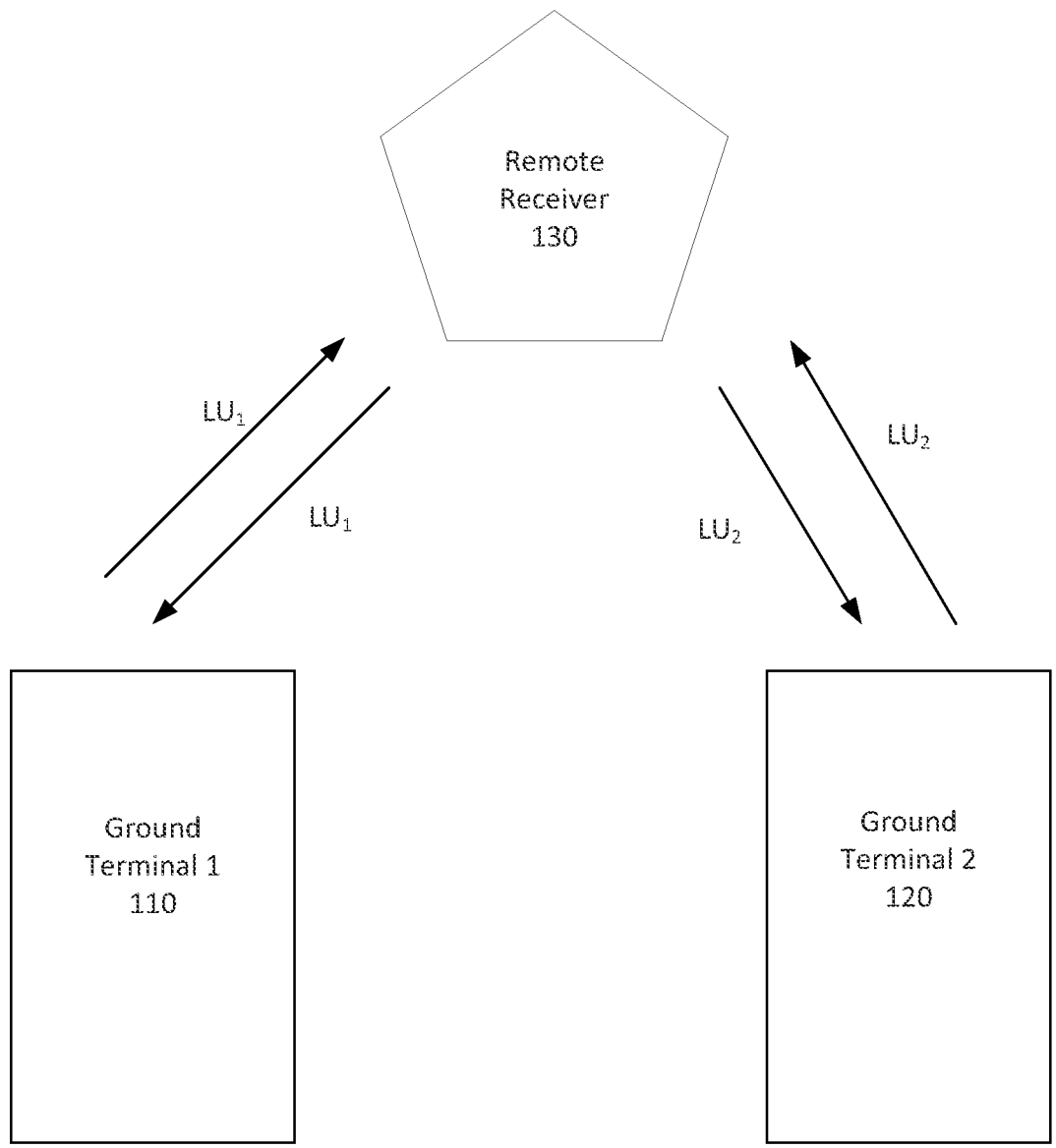
FIG. 1 depicts a configuration of a satellite in communication with ground terminals.

FIG. 1 depicts an example of a CnC satellite link model using a satellite as a remote receiver as depicted. The following variables as defined below are used throughout the remainder of this disclosure:

$T_A$=Transmit RF power of uplink Signal A from Terminal 1

$T_B$=Transmit RF power of uplink Signal B from Terminal 2

$S_A$=Signal-to-Noise Ratio of Signal A received at Terminal 2

$S_B$=Signal-to-Noise Ratio of Signal B received at Terminal 1

$P_{A1}$=Received Power of Signal A received at Terminal 1
$P_{B1}$=Received Power of Signal B received at Terminal 1
$P_{A2}$=Received Power of Signal A received at Terminal 2
$P_{B2}$=Received Power of Signal B received at Terminal 2
$LU_1$=Excess uplink loss at Terminal 1
$LD_1$=Excess downlink loss at Terminal 1
$LU_2$=Excess uplink loss at Terminal 2
$LD_2$=Excess downlink loss at Terminal 2
R=Ratio of $P_A/P_B$ As shown in FIG. 1, Signals A and B are modulated and transmitted from ground terminals 110, 120 to remote satellite receiver 130 and are then transmitted from the remote receiver 130 to the opposite ground terminal 110, 120. Signal-to-noise ratios of Signal A received at ground terminal 2 120 and of Signal B received at ground terminal 1 110 are measured using one or more spectrum analyzers or any other appropriate components and one or more transmit powers TA and TB may then be adjusted to optimize the telecommunications link. In some applications, this optimization requires that a margin between the signal-to-noise ratio of Signal A and a margin between the signal-to-noise ratio of Signal B are optimized. These relative margins equal the difference between the signal-to noise ratio of a data signal received at one of the ground terminals 110, 120 and a threshold signal-to-noise ratio such as $S_{ATh}$ or $S_{BTH}$.

Figure 2:
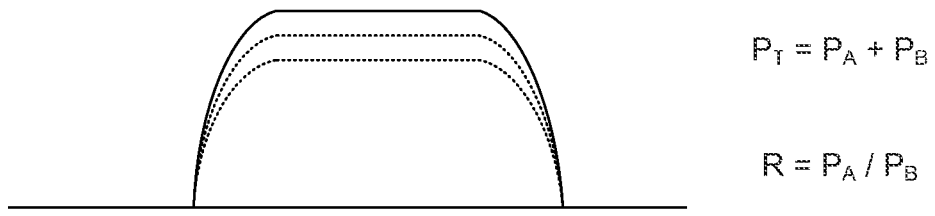
FIG. 2 is a graph of a ratio of power at two ground terminals.

FIG. 2 provides a graph of a sample composite CnC signal, comprised of two signals, transmitted from each ground station. As illustrated in FIG. 2, differences in ground terminal antenna gain, and other link margin parameters generally make the optimal ratio of the power of Signal A to the power of Signal B a value other than unity.

Figure 3:
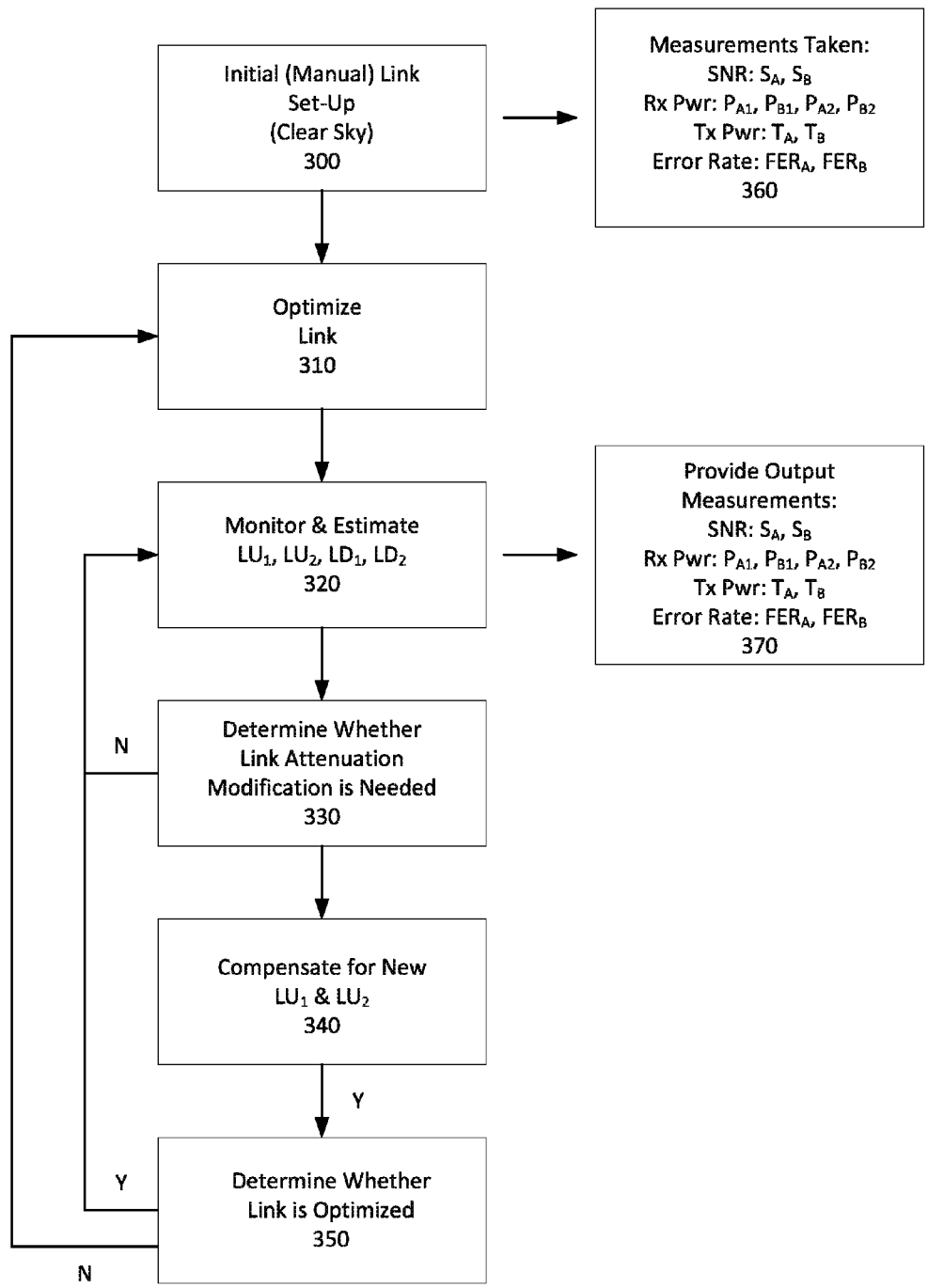
FIG. 3 is a block diagram of a method of optimizing a telecommunications link.

As shown in FIG. 3, which is a block diagram of a method of providing an optimal CnC solution by implementing a CnC power control algorithm, implementations of a CnC power control algorithm fundamentally require knowledge of measured parameters on both sides of the link for a successful performance optimization to occur. Thus, communication between modems or other appropriate components is necessary and direct measurements of frame error rate (FER) are desirable in order to gain positive feedback on potential link errors because the modem is actively changing power levels without manual control or operator feedback.

One of ordinary skill in the art would recognize that the waveforms provided in this disclosure may be comprised of building blocks such as mechanism of modem-to-modem communication, and Cyclic Redundancy Check (CRC) or other direct methods of monitoring frame error rate (FER) during operation.

Set-up of the initial link is typically accomplished in initial (e.g. clear sky) conditions 300 in a manner that those of ordinary skill in the art will recognize as being similar to the set-up of a non-CnC link. Measurements of SNR's, Rx Power, Tx Power, and error rates 360 may be taken during this initial link set-up. The only critical factor that must be established by the user during set-up is that the modem transmit power must be set to levels that achieve the target Power Equivalent Bandwidth (PEB) of the composite signal on the satellite because the optimal signal-to-noise balance and tracking of potential link losses due to rain or other factors will be handled automatically. The transmit power levels, $T_A$ and $T_B$, which yield the target PEB in the nominal initial conditions may be determined in conjunction with the satellite operator using "line-up" procedures that are familiar to those having ordinary skill in the art.

The initial link measures the received signal to noise ratio ("SNR") values of $S_A$ and $S_B$ and has known associated threshold SNR values of $SA_{Th}$ and $SB_{Th}$, dependent upon the modulation and forward error correction (FEC) types used on the link. This disclosure provides for the use of any modulation and FEC type as known to those of ordinary skill in the art.

The following terms are defined below and will be used throughout the remainder of this disclosure:

$M_{AdB}=S_{AdB}-S_{AThdB}$=Margin of Link A expressed in decibels $M_{BdB}=S_{BdB}-S_{BThdB}$=Margin of Link B expressed in decibels $\Delta M_{BAdB}$=Difference in Margin=$(M_{BdB}-M_{AdB})$ expressed in decibels $\Delta T_{AdB}$=Change in transmit power of uplink Signal A (Terminal 1) expressed in decibels $\Delta T_{BdB}$=Change in transmit power of uplink Signal B (Terminal 2) expressed in decibels $R_{dB}$=Ratio of $P_A/P_B$ (R) expressed in decibels In some implementations, the nominal link may be optimized 310 by changing the transmit RF power of Terminal 1 and Terminal 2 thereby causing the margin at each terminal to be the same. In other implementations, a known offset may be introduced, for example, to compensate for differences in rain regions associated with each terminal. In satellite communications, satellite capacity is often leased in terms of Power Equivalent Bandwidth (PEB), which bandwidth is expressed as the same percentage of the satellite transponder the signal of interest is allocated. It is often important that the composite signal maintain a constant target PEB in order to satisfy the leasing agreement. Because the composite signal achieves the target PEB, changes in RF power are made under the constraint that the transmit RF powers of the terminals are modified such that the PEB of the composite signal remains the same.

Under linear conditions, a change in transmit power $\Delta T$ directly affects the link margin M. Hence, in equation form, the link is optimized if:

$$M_{AdB}+\Delta T_{AdB}-(M_{BdB}+\Delta T_{BdB})=0$$

Which implies:

$$\Delta M_{BAdB}=\Delta T_{AdB}-\Delta T_{BdB} \quad [1]$$

It can be shown that in order to maintain constant PEB, the relationship between $\Delta T_{AdB}$ and $\Delta T_{BdB}$ is:

$$\Delta T_{BdB}=10\log_{10}[1+(1-10^{\Delta T_{AdB}/10})10^{T_{dB}/10}] \quad [2]$$

Combining [1] and [2] yields:

$$\Delta M_{BAdB}=\Delta T_{AdB}-10\log_{10}[1+(1-10^{\Delta T_{AdB}/10})10^{R_{dB}/10}] \quad [3]$$

The parameters $\Delta M_{BAdB}$ and $R_{dB}$ are derived from modem measurements of SNR and received power values as well as from knowledge of the SNR thresholds for a given modulation and coding combination. Equation [3] is a non-linear equation that can be solved in a number of well-known ways. One possible approach is to calculate the desired power adjustment factor for uplink Signal A, $\Delta T_{AdB}$ by a straightforward use of Newton's Method for solving non-linear equations as shown below:

Newton's Method is a mechanism for solving a non-linear equation in the form of $$f(x)=0 \quad [B1]$$

The method works iteratively by assuming a solution $x_0$ for [B1], then updating the value of x for n=1,2,3 ... according to $$x_{n+1}=x_n-\frac{f(x_n)}{f'(x_n)} \quad [B2]$$

Considering equation [3], let:

$X=\Delta T_{AdB}$ $R=10^{R_{dB}/10}$ $\Delta M=\Delta M_{BAdB}$ then;

$$f(x)=x-10\log_{10}(1+(1-10^{x/10})R)-\Delta M \quad [B3]$$

and the derivative of f(x) can be found to be $$f'(x) = 1 + \frac{R10^{x/10}}{1 + R - R10^{x/10}} \quad [B4]$$

An initial value of $x_0=0$ can be used, with Equations [B3] and [B4] repeatedly employed in conjunction with [B2] until a solution for x is found that satisfies [B1] within a fixed tolerance.

Once $\Delta T_{AdB}$ is known, [2] may be used to calculate the appropriate value of $\Delta T_{BdB}$ to maintain constant PEB.

Use of Newton's method is one of several approaches to solve for the changes in relative transmit power of the two ground terminal that maintains constant PEB at the satellite. Other iterative mechanisms to solve equation [3] can be used, and are obvious to those of ordinary skill.

Once the telecommunications link has been established and optimized in the initial conditions, it may be continuously monitored for excess link losses. At each terminal, the new received power, P', is related to the initial received power and the excess losses by the following relationship (all values in dB):

$$\begin{aligned} P'_{A1} &= P_{A1} - LU_1 - LD_1 \\ P'_{B1} &= P_{B1} - LU_2 - LD_1 \\ P'_{A2} &= P_{A2} - LU_1 - LD_2 \\ P'_{B2} &= P_{B2} - LU_2 - LD_2 \end{aligned} \rightarrow \begin{bmatrix} P_{A1} - P'_{A1} \\ P_{B1} - P'_{B1} \\ P_{A2} - P'_{A2} \\ P_{B2} - P'_{B2} \end{bmatrix} = \begin{bmatrix} 1 & 0 & 1 & 0 \\ 0 & 1 & 1 & 0 \\ 1 & 0 & 0 & 1 \\ 0 & 1 & 0 & 1 \end{bmatrix} \begin{bmatrix} LU_1 \\ LU_2 \\ LD_1 \\ LD_2 \end{bmatrix} \quad [4]$$

As shown above, [4] is a system of 4 equations and 4 unknowns, however this system is not linearly independent, and hence cannot be solved uniquely. Several approaches can be used to solve this system of equations. One approach is to make the following assumption, based on a physical approximation:

$$\frac{LD_1}{LU_1} = \frac{LD_2}{LU_2} \quad [5]$$

A physical implication of the assumption in [5] is that the ratio of uplink to downlink rain attention for a given link from a ground terminal to the satellite is approximately constant for a given frequency band of operation, regardless of rain rate.

Using [5] in a reduced set of [4] yields:

$$A = P_{A1} - P'_{A1} = LU_1 + \frac{LU_1}{LU_2} LD_2 \quad [6]$$

$$B = P_{A2} - P'_{A2} = LU_1 + LD_2$$

$$C = P_{B2} - P'_{B2} = LU_2 + LD_2$$

The system of equations in [6] can be solved as:

$$LU_1 = \frac{A(B-C)}{A-c} \quad [7]$$

$$LU_2 = \frac{C(B-C)}{A-C}$$

$$LD_1 = \frac{A(A-B)}{A-C}$$

$$LD_2 = \frac{C(A-D)}{A-C}$$

It is important to note that in practical calculations of [7], accurate values of A, B, & C are obtained by significantly averaged (not instantaneous) power measurements and that care should be taken under the conditions where A=C, or A≅C. This condition occurs when $LU_1$ equals or approximately equals $LU_2$, which also implies that $LD_1$ equals or approximately equals $LD_2$. Under this condition, the ratios for LU/LD shown in the charts below can be used to solve for the appropriate values of LU and LD, in place of [7]. These are only example ratios, and those of ordinary skill will readily see different values could be utilized in other to achieve equivalent results.

A second approach is to always make the assumption that the ratio LU/LD is always a known constant whenever rain is present. In this case $$A = P_{A1} - P'_{A1} = LU_1 + LD_1$$

$$C = P_{B2} - P'_{B2} = LU_2 + LD_2$$

$$\frac{LU_1}{LD_1} = \frac{LU_2}{LD_2} = K$$

As with the first approach above, accurate values of A & C are obtained by significantly averaged (not instantaneous) power measurements. Values of $LU_1$, $LD_1$, $LU_2$, and $LD_2$ are then readily calculated by knowledge of the appropriate value of K. The appropriate constant K depends on the satellite frequency band of operation (e.g. C, X, Ku, Ka, etc.). Example calculations of possible values of K to be used for some example satellite frequency bands are shown in the charts below. Again, these are example ratios, and those of ordinary skill will readily see that somewhat different values could be calculated and utilized in order to achieve equivalent results.

The CnC power control algorithm uses the baseline optimized link parameters described above together with the above-referenced mechanism to calculate excess link attenuation factors with appropriate estimation averaging to determine if excess uplink and downlink attenuation has been changed by rain or other factors 320. Output measurements of SNRs, Rx Power, Tx Power, and Error Rates may be used to make this determination 370. If values of $LU_1$, $LU_2$, $LD_1$, and $LD_2$, are unchanged, no action is taken. In the event that a change is detected, the algorithm branches to attempt compensation 330.

Within the RF power limits of each terminal, excess uplink attenuation $LU_1$ and $LU_2$, can be compensated by increasing the transmit RF power of the appropriate modem 340. Compensating for the excess uplink attenuation automatically maintains the target PEB at the satellite established in the system line-up conditions.

Depending on the attenuation conditions, once the uplink power has been compensated, the margins on the links may or may not be balanced. Potential imbalance can arise from unequal downlink attenuation $LD_1$, and $LD_2$. Hence the SNRs at each modem are also continuously monitored. After correcting for uplink attenuation, a determination is made as to whether the link is optimized 350. If the margin imbalance exceeds some threshold, the algorithm returns to the "Optimize Link" stage 310 or else it returns to the "Monitor and Estimate Excess Link Attenuation" stage.

The following section of this document, entitled "Rain Loss Ratios" provides a non-limiting example of rain loss ratios due to attenuation.

Rain Loss Ratios

Rain attenuation "A" in dB/km is often modeled by the equation:

$$A = aR^b \quad \text{[A1]}$$

In [A1] R is the rainfall rate in mm/hr, and a and b are factors that depend on frequency. As described in R. L. Olsen, D. V Rogers, and D. B Hodge, "The aRb Relation in the Calculation of Rain Attenuation," IEEE Transactions on Antenna and Propagation, AP-26, 318-329 (March 1978), the contents of which is incorporated herein by reference in its entirety, an empirical model for a and b is given by:

$$a = (4.21 \times 10^{-5}) f^{2.42} \quad 2.9 \le f \le 54 \text{ GHz} \quad \text{[A2]}$$
$$= (4.09 \times 10^{-2}) f^{0.699} \quad 54 \le f \le 180 \text{ GHz}$$

$$b = 1.41 f^{0.0779} \quad 8.5 \le f \le 25 \text{ GHz} \quad \text{[A3]}$$
$$= 2.63 f^{0.272} \quad 25 \le f \le 164 \text{ GHz}$$

Uplink and downlink frequencies associated with common satellite bands are listed in

TABLE 1

Table 1: Uplink and Downlink Satellite Frequency Bands

| Band | Downlink (GHz) | | | Uplink (GHz) | | |
|---|---|---|---|---|---|---|
| | $f_{low}$ | $f_{high}$ | $f_{mid}$ | $f_{low}$ | $f_{high}$ | $f_{mid}$ |
| C-band | 3.4 | 4.2 | 3.8 | 5.85 | 6.65 | 6.25 |
| X-band | 7.25 | 7.75 | 7.5 | 7.9 | 8.4 | 8.15 |
| Ku-band | 11.7 | 12.2 | 11.95 | 14 | 14.5 | 14.25 |
| Ka-band | 20.2 | 21.2 | 20.7 | 30 | 31 | 30.5 |

Using the mid-range value for each band, and assuming that the value for "b" in [A3] can also be approximately used for C and X band frequencies below 8.5 GHz yields the following calculations of relative attenuation factors:

TABLE 2

C-band and X-band Uplink/Downlink Attenuation Ratios

| | C-band | | | | | X-band | | | |
|---|---|---|---|---|---|---|---|---|---|
| Rain Rate | $A_{dwn}$ | $A_{up}$ | Ratio | Ratio (relevant) | Rain Rate | $A_{dwn}$ | $A_{up}$ | Ratio | Ratio (relevant) |
| 10 | 0.0199 | 0.0593 | 2.98 | | 10 | 0.0885 | 0.1063 | 1.20 | |
| 30 | 0.0802 | 0.2270 | 2.83 | 2.83 | 30 | 0.3328 | 0.3963 | 1.19 | 1.19 |
| 50 | 0.1536 | 0.4238 | 2.76 | 2.76 | 50 | 0.6159 | 0.7305 | 1.19 | 1.19 |
| 70 | 0.2355 | 0.6394 | 2.72 | 2.72 | 70 | 0.9239 | 1.0930 | 1.18 | 1.18 |
| 90 | 0.3241 | 0.8694 | 2.68 | 2.68 | 90 | 1.2507 | 1.4767 | 1.18 | 1.18 |
| 110 | 0.4182 | 1.1111 | 2.66 | 2.66 | 110 | 1.5929 | 1.8778 | 1.18 | 1.18 |
| 130 | 0.5171 | 1.3628 | 2.64 | 2.64 | 130 | 1.9481 | 2.2936 | 1.18 | 1.18 |
| 150 | 0.6203 | 1.6233 | 2.62 | 2.62 | 150 | 2.3148 | 2.7223 | 1.18 | 1.18 |
| 170 | 0.7272 | 1.8917 | 2.60 | 2.60 | 170 | 2.6917 | 3.1625 | 1.17 | 1.17 |
| 190 | 0.8376 | 2.1672 | 2.59 | 2.59 | 190 | 3.0778 | 3.6130 | 1.17 | 1.17 |
| 210 | 0.9512 | 2.4493 | 2.57 | 2.57 | 210 | 3.4723 | 4.0730 | 1.17 | 1.17 |
| 230 | 1.0678 | 2.7374 | 2.56 | 2.56 | 230 | 3.8747 | 4.5417 | 1.17 | 1.17 |
| 250 | 1.1871 | 3.0311 | 2.55 | 2.55 | 250 | 4.2843 | 5.0186 | 1.17 | 1.17 |
| | | Avg | 2.67 | 2.65 | | | Avg | 1.18 | 1.18 |
| | | Max Δ | 0.31 | 0.18 | | | Max Δ | 0.02 | 0.01 |
| | | Max Δ % | 11.6% | 6.8% | | | Max Δ % | 1.8% | 1.1% |

TABLE 3

Ku-band and Ka-band Uplink/Downlink Attenuation Ratios

| | Ku-band | | | | | Ka-band | | | |
|---|---|---|---|---|---|---|---|---|---|
| Rain Rate | $A_{dwn}$ | $A_{up}$ | Ratio | Ratio (relevant) | Rain Rate | $A_{dwn}$ | $A_{up}$ | Ratio | Ratio (relevant) |
| 10 | 0.2476 | 0.3655 | 1.48 | 1.48 | 10 | 0.8365 | 1.7962 | 2.15 | 2.15 |
| 30 | 0.8877 | 1.2879 | 1.45 | 1.45 | 30 | 2.8429 | 5.6188 | 1.98 | 1.98 |
| 50 | 1.6073 | 2.3132 | 1.44 | 1.44 | 50 | 5.0211 | 9.5485 | 1.90 | 1.90 |
| 70 | 2.3765 | 3.4020 | 1.43 | 1.43 | 70 | 7.3033 | 13.5402 | 1.85 | |
| 90 | 3.1827 | 4.5380 | 1.43 | 1.43 | 90 | 9.6617 | 17.5762 | 1.82 | |
| 110 | 4.0187 | 5.7118 | 1.42 | 1.42 | 110 | 12.0809 | 21.6468 | 1.79 | |
| 130 | 4.8798 | 6.9174 | 1.42 | | 130 | 14.5508 | 25.7458 | 1.77 | |
| 150 | 5.7628 | 8.1506 | 1.41 | | 150 | 17.0644 | 29.8690 | 1.75 | |
| 170 | 6.6651 | 9.4082 | 1.41 | | 170 | 19.6164 | 34.0132 | 1.73 | |
| 190 | 7.5849 | 10.6876 | 1.41 | | 190 | 22.2029 | 38.1761 | 1.72 | |

TABLE 3-continued

Ku-band and Ka-band Uplink/Downlink Attenuation Ratios

| Rain Rate | Ku-band $A_{dwn}$ | $A_{up}$ | Ratio | Ratio (relevant) | Rain Rate | Ka-band $A_{dwn}$ | $A_{up}$ | Ratio | Ratio (relevant) |
|---|---|---|---|---|---|---|---|---|---|
| 210 | 8.5205 | 11.9870 | 1.41 | | 210 | 24.8204 | 42.3557 | 1.71 | |
| 230 | 9.4707 | 13.3047 | 1.40 | | 230 | 27.4665 | 46.5505 | 1.69 | |
| 250 | 10.4345 | 14.6392 | 1.40 | | 250 | 30.1389 | 50.7592 | 1.68 | |
| | | Avg | 1.42 | 1.44 | | | Avg | 1.81 | 2.01 |
| | | Max Δ | 0.05 | 0.04 | | | Max Δ | 0.34 | 0.14 |
| | | Max Δ % | 3.7% | 2.5% | | | Max Δ % | 183% | 6.9% |

Units of attenuation values shown in the Tables are in dB/km. Typical "effective path length" over which the rainfall attenuation applies varies depends on several geometric factors, but is typically in the approximate range of 3 to 10 km.

Practical rainfall rates can range up to 250 mm/hr. However, rainfall rates in non-tropical regions rarely exceed 100 mm/hr. CCIR rain regions are defined by one of 14 letters (A,B,C,D,E,F,G,H,J,K,L,M,N,P), with the lowest letters associated with low rainfall arctic environments, and the highest associated with tropical environments. The rainfall rate is at or above 100 mm/hr less than 0.01% of the time in all but rainfall region P (tropical).

Ratios in Table 2 are calculated for all rain fall rates, and for relevant rates. For the C-band and X-band cases, rain fall rates at or below 10 mm/hr cause only a minor amount of rain loss, hence these rates can be excluded from consideration in calculating the maximum possible excursion of the "relevant" attenuation values relative to the mean.

Ratios in Table 3 are also calculated for all rainfall rates, and for relevant rates. In the case of Ku-band and Ka-band frequencies, very high rain fall rates are not considered relevant, because it is unlikely that a satellite link will be designed with sufficient margin to operate in these rainfall events (i.e. rainfall at high rates represent link outages).

An assumption is made in equation [5] above that LD1/LU1=LD2/LU2. Another way of stating this assumption is that the ratio of uplink to downlink loss is constant over all relevant rain rates. The tabulated results given in Table 2 and Table 3 show that this assumption is valid to within less than a 10% maximum variation the satellite bands of interest, and relevant rain rates.

The implementations listed here, and many others, will become readily apparent from this disclosure. From this, those of ordinary skill in the art will readily understand the versatility with which this disclosure may be applied.

The invention claimed is:

1. A method of transmitting telecommunications data comprising:
    modulating a first and a second data signal for transmitting over a telecommunications system using a modulation format;
    transmitting the first and second data signals through a telecommunications channel of the telecommunications system to a remote receiver, the first data signal being transmitted from a first terminal and the second data signal being transmitted from a second terminal;
    transmitting, by the remote receiver, the first data signal to the second terminal and the second data signal to the first terminal;
    measuring a received signal-to-noise ratio of the first data signal received at the second terminal and a received signal-to-noise ratio of the second data signal received at the first terminal;
    changing a transmit power of at least one of the first and second terminals such that a margin between the signal-to-noise ratio of the first data signal and a margin between the signal-to-noise ratio of the second data signal is optimized, wherein the margin is equal to a difference between signal-to-noise ratio of a data signal received at one terminal and a threshold signal-to-noise ratio.

2. The method of claim 1 wherein the first and second data signals are optimized when the margin of the first data signal and the margin of the second data signal are equal at the first and second terminals.

3. The method of claim 1 further comprising monitoring the margins for a loss in performance of a telecommunications link.

4. The method of claim 3 wherein the loss in performance is determined by a loss in power resulting from uplinking and downlinking between the terminals and remote receiver.

5. The method of claim 3 further comprising adjusting the transmit power of at least one of the first and second terminals in response to detection of the loss of performance of the telecommunications link such that a pre-determined power equivalent bandwidth (PEB) is maintained.

6. The method of claim 1 further comprising detecting a change in attenuation by applying estimation averaging of pre-determined ratios of uplink to downlink attenuation for one or more attenuation factors.

7. The method of claim 6 further comprising adjusting the transmit power of one or more terminals when a change in attenuation is detected.

8. The method of claim 7 further comprising monitoring a signal-to-noise ratio of a modem at two or more receiving terminals.

9. The method of claim 8 further comprising detecting unequal downlink attenuation at the two or more terminals.

10. The method of claim 8 further comprising optimizing the first and second data signals if an imbalance of signal-to-noise ratios between two terminals is detected that exceeds a predetermined threshold.

11. The method of claim 8 further comprising estimating a change in attenuation by applying estimation averaging of pre-determined ratios of uplink to downlink attenuation for one or more attenuation factors if an imbalance of signal-to-noise ratios between two terminals is less than a predetermined threshold.

12. A system of transmitting telecommunications data comprising:
    one or more modulators that modulates a first and a second data signal using a modulation format;
    one or more transmitters that receive the first and second data signals from the one or more modulators and transmit the first and second data signals through a telecommunications channel to a remote receiver, the first data signal being transmitted from a first terminal and the second data signal being transmitted from a second terminal;

a remote receiver that receives the first and second signals from the one or more transmitters and transmits the first data signal to the second terminal and the second data signal to the first terminal;

one or more spectrum analyzers that measures a signal-to-noise ratio of the first data signal received at the second terminal from the remote receiver and a signal-to-noise ratio of the second data signal received at the first terminal from the remote receiver;

one or more power controllers that change a transmit power of at least one of the first and second terminals such that a margin between the signal-to-noise ratio of the first signal and a margin between the signal-to-noise ratio of the second data signal is optimized, wherein the margin is equal to a difference between signal-to-noise ratio of a data signal received at one terminal and a threshold signal-to-noise ratio.

13. The system of claim 12 wherein the first and second data signals are optimized when the margin of the first data signal and the margin of the second data signal are equal at the first and second terminals.

14. The system of claim 12 wherein the one or more spectrum analyzers further monitor the margins for a loss in performance of a telecommunications link.

15. The system of claim 14 wherein the loss in performance is determined by a loss in power resulting from uplinking and downlinking between the terminals and remote receiver.

16. The system of claim 14 wherein the one or more power controllers further adjust the transmit power of at least one of the first and second terminals in response to detection of the loss of performance of the telecommunications link such that a pre-determined power equivalent bandwidth (PEB) is maintained.

17. The system of claim 12 wherein the one or more spectrum analyzers further detect a change in attenuation by applying estimation averaging of pre-determined ratios of uplink to downlink attenuation for one or more attenuation factors.

18. The system of claim 17 wherein the one or more power controllers further adjust the transmit power of one or more terminals when a change in attenuation is detected.

19. The system of claim 18 wherein the one or more spectrum analyzers further monitor a signal-to-noise ratio of a modem at two or more receiving terminals.

20. The system of claim 19 wherein the one or more spectrum analyzers further detect unequal downlink attenuation at the two or more terminals.

21. The system of claim 19 wherein the one or more power controllers optimize the first and second data signals if the one or more spectrum analyzers detects an imbalance of signal-to-noise ratios between two terminals that exceeds a predetermined threshold.

22. The system of claim 19 wherein the one or more spectrum analyzers estimates a change in attenuation by applying estimation averaging of pre-determined ratios of uplink to downlink attenuation for one or more attenuation factors if an imbalance of signal-to-noise ratios between two terminals is less than a predetermined threshold.

\* \* \* \* \*